US012758931B2

(12) United States Patent
Hoibl

(10) Patent No.: US 12,758,931 B2
(45) Date of Patent: Oct. 13, 2026

(54) APPARATUS FOR APPLYING A MULTI-COMPONENT VISCOUS MATERIAL TO WORKPIECES

(71) Applicant: Atlas Copco EPS GmbH, Neustadt/Donau (DE)

(72) Inventor: Andreas Hoibl, Pentling (DE)

(73) Assignee: Atlas Copco EPS GmbH, Neustadt/Donau (DE)

( * ) Notice: Subject to any disclaimer, the term of this patent is extended or adjusted under 35 U.S.C. 154(b) by 161 days.

(21) Appl. No.: 18/748,288

(22) Filed: Jun. 20, 2024

(65) Prior Publication Data

US 2024/0424461 A1 Dec. 26, 2024

(30) Foreign Application Priority Data

Jun. 21, 2023 (DE) ..................... 10 2023 116 174.1

(51) Int. Cl.
*B01F 35/75* (2022.01)
*B01F 25/00* (2022.01)
(Continued)

(52) U.S. Cl.
CPC ...... *B01F 35/7547* (2022.01); *B01F 25/1051* (2022.01); *B05C 5/0229* (2013.01); *B33Y 80/00* (2014.12)

(58) Field of Classification Search
CPC . B01F 35/7547; B01F 25/1051; B05C 5/0229
See application file for complete search history.

(56) References Cited

U.S. PATENT DOCUMENTS 3,315,899 A * 4/1967 Quarve ................. B05C 5/0229 239/586
5,065,910 A * 11/1991 Fiedler .................. B05C 5/0229 141/117

(Continued)

FOREIGN PATENT DOCUMENTS

DE 20 2018 106 654 U1 2/2019
DE 10 2018 108 915 A1 10/2019

(Continued)

OTHER PUBLICATIONS

German Search Report dated Feb. 6, 2024 in German Application No. 10 2023 116 174.1, with English translation of the relevant parts.

*Primary Examiner* — Jeremy Carroll
(74) *Attorney, Agent, or Firm* — Collard & Roe, P.C.

(57) ABSTRACT

An apparatus for applying a multi-component viscous material to workpieces includes a metering unit having a number of metering valves corresponding to the number of components of the material, as well as a coupling device, and having a mixing unit having a material inlet at a first end, and a coupling part releasably connected to the coupling device, and, at a second end, a mixing tube having an exit opening for the material, as well as a mixing structure arranged in the tube, for mixing the components as they are passed through the tube from the inlet to the exit. A needle valve releases and closes the exit opening and has a valve needle extending in a longitudinal direction from the material inlet to the exit opening that releases the exit opening in a release position, and closes it in a closed position, by contacting a valve seat.

15 Claims, 3 Drawing Sheets

(51) Int. Cl.

| | |
|---|---|
| ***B05C 5/02*** | (2006.01) |
| *B33Y 80/00* | (2015.01) |

(56) References Cited

U.S. PATENT DOCUMENTS

| | | | | |
|---|---|---|---|---|
| 5,071,040 | A * | 12/1991 | Laptewicz, Jr. .... B01F 33/5011 | 604/218 |
| 5,372,283 | A | 12/1994 | Schmitkons et al. | |
| 2008/0056061 | A1 | 3/2008 | Pauser et al. | |
| 2014/0117045 | A1* | 5/2014 | Varga ................ B01F 25/43161 | 222/145.5 |
| 2018/0043381 | A1* | 2/2018 | Orla-Jensen .......... B05C 5/0225 | |
| 2019/0054437 | A1 | 2/2019 | Hopkins | |
| 2021/0146397 | A1 | 5/2021 | Mittag et al. | |

FOREIGN PATENT DOCUMENTS

| | | | |
|---|---|---|---|
| DE | 10 2018 119 838 | A1 | 2/2020 |
| EP | 3 495 036 | A1 | 6/2019 |
| EP | 3 978 108 | A2 | 4/2022 |

* cited by examiner

APPARATUS FOR APPLYING A MULTI-COMPONENT VISCOUS MATERIAL TO WORKPIECES

CROSS REFERENCE TO RELATED APPLICATIONS

Applicant claims priority under 35 U.S.C. § 119 of German Application No. 10 2023 116 174.1 filed Jun. 21, 2023, the disclosure of which is incorporated by reference.

BACKGROUND OF THE INVENTION

1. Field of the Invention

The invention relates to an apparatus for applying a multi-component viscous material to workpieces.

2. Description of the Related Art

Such an apparatus is known, for example, from DE 10 2018 119 838 A1. It serves for applying a viscous material, which has at least two components, to workpieces, in particular to vehicle parts, in production. The previously known apparatus has a metering unit that has a number of metering valves that corresponds to the number of components of the viscous material, and a coupling device by means of which the metering unit is releasably connected to a mixing unit. The metering unit meters the individual components of the viscous material and conducts them into a material inlet at the first end of the mixing unit. The mixing unit has a mixing tube as well as a mixing structure arranged in the mixing tube, which structure ensures good mixing of the components as they are being passed through the mixing unit from the material inlet to an exit opening at the second end. In particular, the viscous material that was mixed from the multiple components in the mixing unit is applied to the workpieces in the form of a bead. In this regard, however, there is the difficulty of defining the end of a material bead precisely. When the metering valves are closed to end the material application, there is still material in the mixing unit, which material can exit from the exit opening. In order not to lengthen the applied material bead in an undesired way, the application apparatus is therefore often moved back a short distance at the end of the material bead, so as to position any material that drips down afterward in the region of the material bead that has already been applied, by means of such a path reversal. This measure, however, extends the cycle time at which the application apparatus is operated.

SUMMARY OF THE INVENTION

It is therefore the task of the present invention to further develop an apparatus of the type stated initially, in such a manner that the material separation at the exit opening can be better defined.

This task is accomplished by means of an apparatus having the characteristics according to the invention. Advantageous further developments of the invention are discussed below.

The invention is based on the idea of having the material application from the exit opening tear off in a defined manner, by means of the use of the needle valve, by means of closing this opening by means of contact of the valve needle with the valve seat. If the exit opening is closed by means of the valve needle, no material can drip out from the mixing unit, so that the end of the material application can be significantly better defined. A path reversal is then also no longer necessary, so that shorter cycle times are made possible.

The mixing unit can be what is called an X-grid mixing unit, the mixing structure of which comprises two groups of diagonal struts that intersect along an intersection line that runs transverse to the longitudinal direction. The valve needle then runs centrally through the diagonal struts. Furthermore, it is possible that the mixing unit is what is called a Quadro mixing unit. It is preferred, however, that the mixing structure has an inner tube that is arranged in the mixing tube and extends in the longitudinal direction. The valve needle then extends through the inner tube, and a mixing spiral extends radially away from the inner tube, along which spiral the components flow down from the material inlet all the way to the exit opening, and mix with one another while flowing. In this regard, it is preferred that the valve needle projects from the inner tube at a front end of the inner tube, which end faces the valve seat, and is conducted to be sealed off at the front end of the inner tube, by means of a sealing element. The valve needle is then separated from the viscous material and comes into contact with it only in the region of the valve seat. The seal at the front end of the inner tube prevents internal leakages, in particular penetration of material into the inner tube, and thereby improves the mixing quality and allows higher material pressures in the mixing unit. In all cases, the material inlet of the mixing unit communicates with feed channels of the metering unit, by way of which channels the components of the viscous material are passed to the mixing unit in a metered manner, and which channels can be blocked and released, in each instance, by means of one of the metering valves.

The mixing unit can be produced in a conventional manner, in particular in one piece or multiple pieces, by means of drilling, lathing, milling or injection-molding methods or a combination of such methods. It is advantageous, however, to produce the mixing unit in one piece, by means of 3D printing. In this regard, different materials can be used. In particular, the mixing tube and the mixing structure can consist of a first material, wherein materials are preferred that consist of a polylactide (PLA) or an acrylonitrile butadiene styrene copolymer (ABS) or at least comprise them, while the valve seat and the sealing element can each be produced from a different second material. In particular, ABS can be structured for protection against electrostatic discharges (ESD protection). In this regard, it is possible to produce the valve seat and the sealing element from the same second material or, here too, to use two different materials.

It is practical if the needle valve has a drive unit for moving the valve needle, in particular a pneumatic drive unit. A motor-driven spindle drive, a hydraulic drive or a lifting magnet can also be used for this purpose. It is advantageous if the drive unit is releasably connected to the metering unit, so as to be able to replace the needle valve in a simple manner. In this regard, it is possible that the valve needle can be moved, by way of the drive unit, in the longitudinal direction, into the closed position, and, counter to the longitudinal direction, into the release position. The needle valve, however, can also be configured as what is called a snuff back valve, in which the valve needle can be moved, by means of the drive unit, into the release position in the longitudinal direction, and into the closed position counter to the longitudinal direction. A snuff back valve has the advantage that material that is situated in the region of the valve seat is not pressed out of the exit opening when the valve is being closed, but rather is drawn back, at least in part, into the exit opening, so that the end of the material application can be defined even better.

In order to achieve better mixing of the components, the mixing structure can be accommodated so as to rotate in the mixing tube, about a rotational axis that runs in the longitudinal direction. In this regard, a motor drive of the mixing structure is preferred, for example by way of a hollow shaft, through which the valve needle also runs, at least in certain sections.

It is advantageous if the valve needle is produced from metal or hard metal. In this regard, hard metal is understood to be a metal matrix composite material, in which hard substances present in particle form are held together by means of a matrix. Hard substances that can be used are, in particular, metal carbides or metal nitrides, such as, for example, tungsten carbide, titanium carbide, titanium nitride, niobium carbide, tantalum carbide or vanadium carbide. Metal and, in particular, hard metal are wear-resistant materials. Furthermore, it is possible that the valve needle, together with the mixing unit, is produced by means of 3D printing. Production by 3D printing is particularly advantageous if the needle valve is configured as a snuff back valve, because the valve needle then does not need to be introduced into the mixing unit from the direction of the exit opening, in a complicated manner. In the formation of the needle valve as a snuff back valve, it is also advantageous to configure the valve needle in two parts. In this regard, the two parts of the valve needle are introduced into the mixing unit from opposite directions, and then firmly connected to one another.

It is advantageous if a device for producing a vacuum is provided in the mixing tube. If the mixing tube is kept under a vacuum, the risk of dripping of the material from the exit opening is further minimized.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
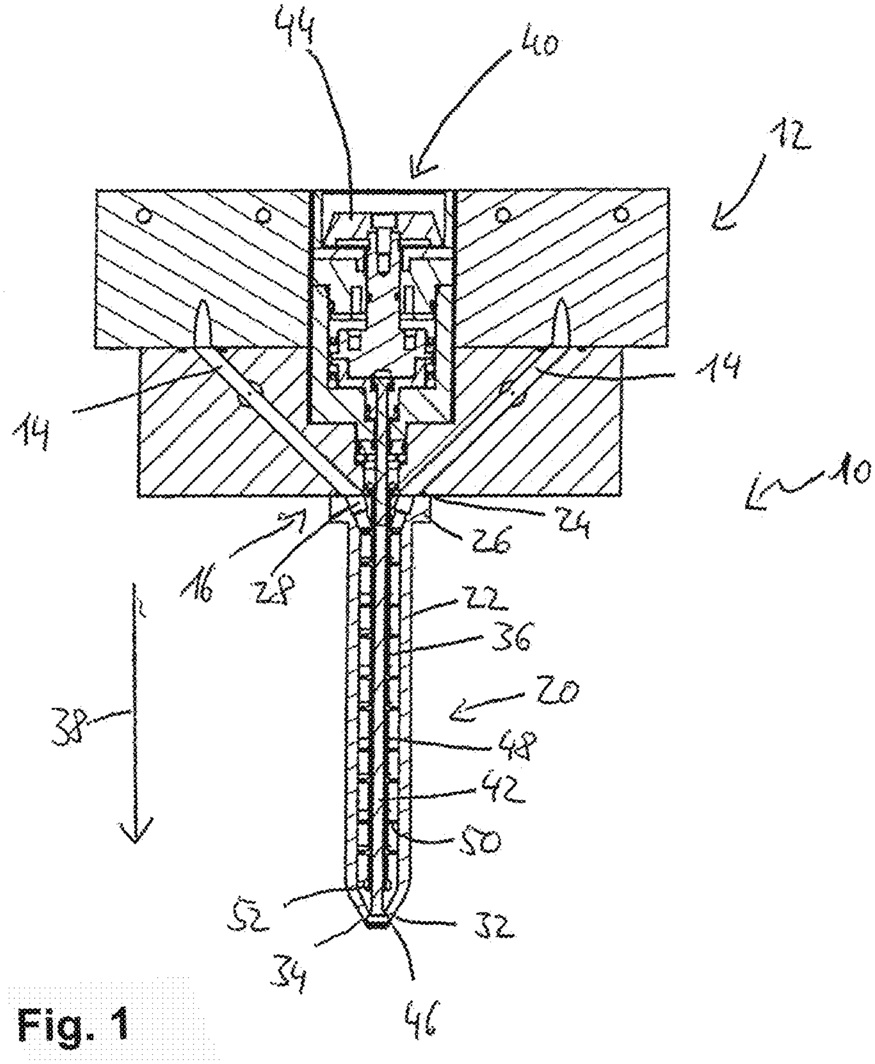
FIG. 1 shows an apparatus for applying a viscous material, in a schematic representation, in section.

The application apparatus 10 shown in the drawing serves for applying a multi-component viscous material to workpieces, in accordance with the present exemplary embodiment of a two-component viscous material, for example of an adhesive that is mixed from two components, namely a base component and a hardener. It has a metering unit 12, which has a feed channel 14 for each of the components, by way of which channel the component is supplied, in each instance. Each of the feed channels 14 can be blocked and released by means of a metering valve not shown in the drawing, so that each component can be supplied in a metered manner. The metering unit 12 furthermore has a coupling device 16, to which a mixing unit 20 is releasably attached. The mixing unit 20 has a mixing tube 22, at the first end 24 of which a coupling part 26 is arranged, which serves for a releasable connection to the coupling device 16. Likewise, a material inlet 28 is arranged at the first end 24 of the mixing tube 22, into which inlet the feed channels 14 open. In the exemplary embodiment shown here, the material inlet 28 has two material inlet channels 30, wherein one of the feed channels 14 opens into each of the material inlet channels 30. Of course, this principle can also be applied to the application of a viscous material composed of more than two materials, wherein a number of metering valves and feed channels that corresponds to the number of components is always provided in the metering unit 12, which channels and valves open into the material inlet 28, which can then also have a number of material inlet channels that corresponds to the number of components.

Figure 2A:
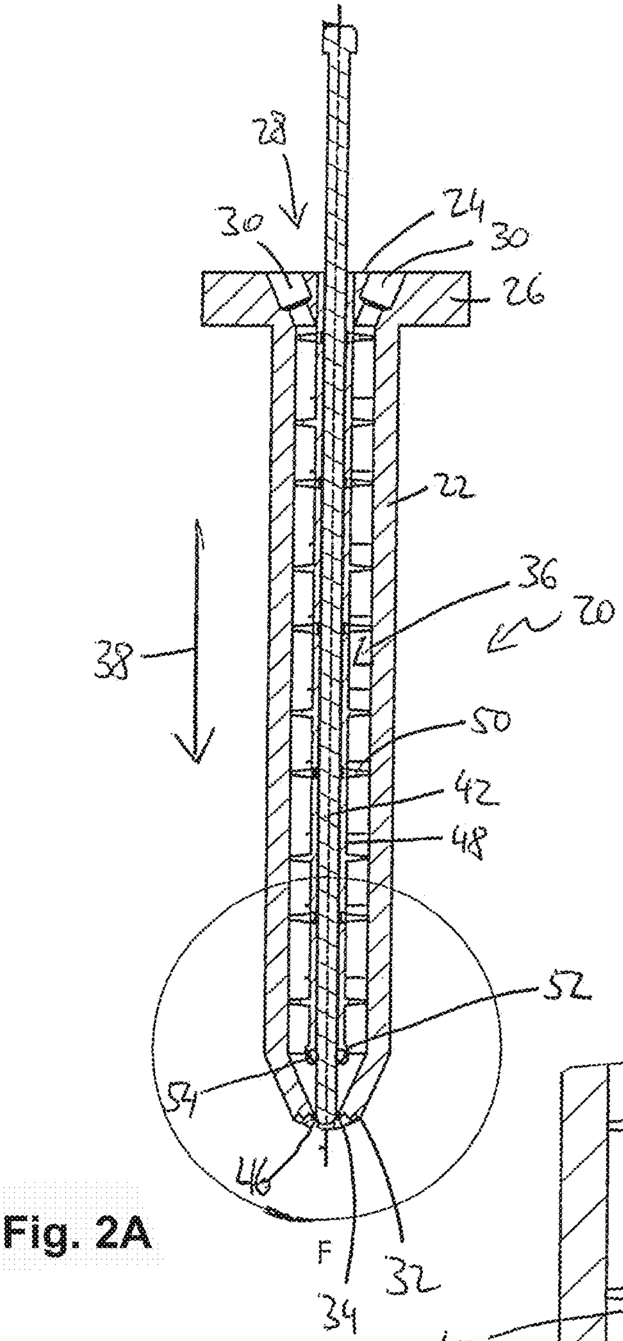
FIG. 2A shows a mixing unit for an apparatus according to FIG. 1, according to a first embodiment, in section.
Figure 2B:
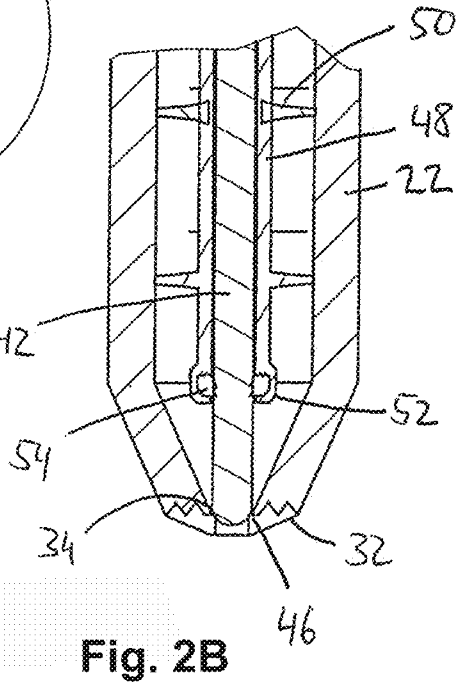
FIG. 2B shows an enlargement of the detail F in FIG. 2A.
Figure 3A:
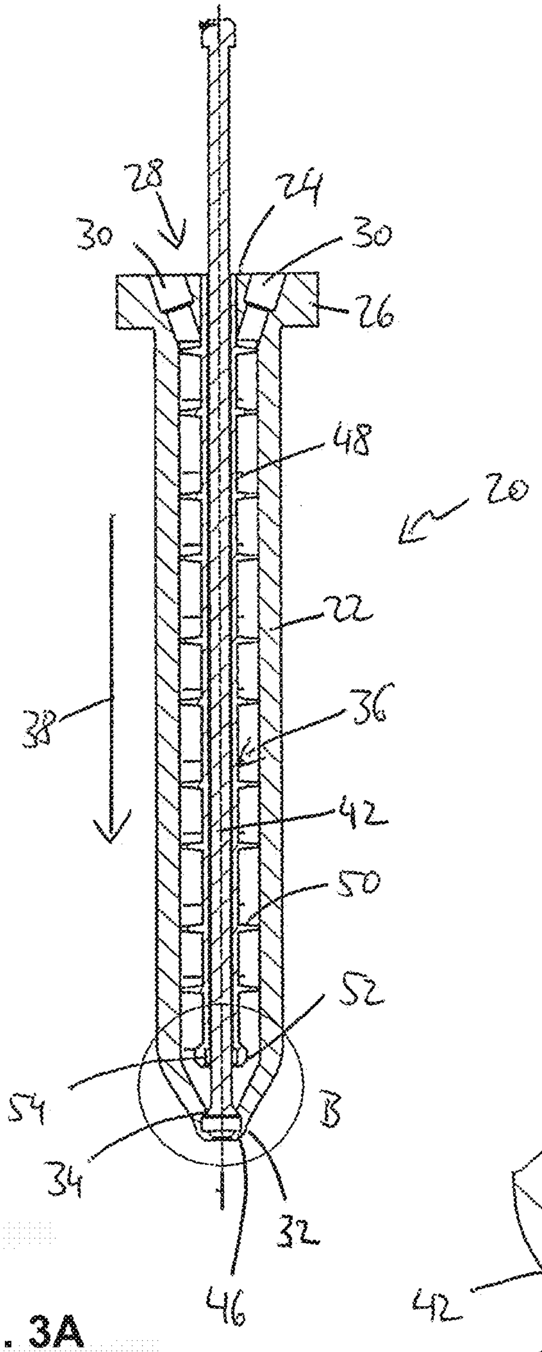
FIG. 3A show a mixing unit for an apparatus according to FIG. 1, according to a second embodiment, in section.
Figure 3B:
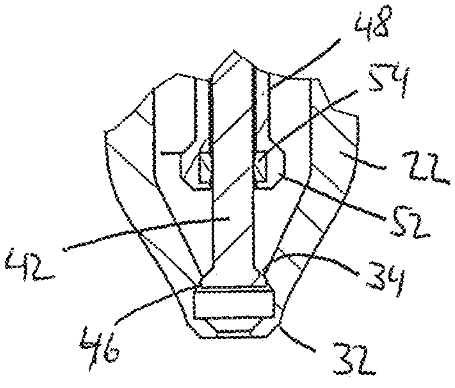
FIG. 3B shows an enlargement of the detail B in FIG. 3A.

At the second end 32 of the mixing tube 22, the tube has an exit opening 34 from which the viscous material produced by mixing of the components exits for application to workpieces. In the mixing tube 22, a mixing structure 36 is arranged, which serves for mixing the components on their way from the material inlet 28 to the exit opening 34 as homogeneously as possible. A valve needle 42 of a needle valve 40 extends in the longitudinal direction 38, which extends from the material inlet 28 to the exit opening 34. The needle valve 40 furthermore has a pneumatic drive unit 44 releasably connected to the metering unit 12, by means of which unit the valve needle 42 can be moved in and counter to the longitudinal direction 38, in a limited manner. A valve seat 46 is arranged at the exit opening 34, wherein the valve needle 42 closes off the exit opening 34 in a closed position, by means of contact with the valve seat 46, and releases it in a release position, in which it is lifted up from the valve seat 46. In this regard, the valve needle 42 is moved into the release position counter to the longitudinal direction 38, and into the closed position in the longitudinal direction 38, in the first exemplary embodiment shown in FIGS. 2A, 2B. In contrast, in the case of the second exemplary embodiment according to FIGS. 3A, 3B, the needle valve 40 is configured as a snuff back valve, and the valve needle 42 is moved into the release position in the longitudinal direction 38, and into the closed position counter to the longitudinal direction 38.

In the case of both exemplary embodiments, the mixing unit 20 has an inner tube 48 arranged in the mixing tube 22, through which inner tube the valve needle 42 extends. A mixing spiral 50 extends radially away from the inner tube 48, which spiral extends all the way to the mixing tube 22, and forms a spiral-shaped surface that is inclined toward the exit opening 34, over which surface the components flow down and mix as they flow down. The valve needle 42 stands at a front end 52 of the inner tube 48, which end faces the exit opening 34 and is arranged at a distance from it, and projects out of the tube. Furthermore, a circumferential sealing element 54 that lies against the valve needle 42, forming a seal, is arranged in the inner tube 48 at the front end 52 of the inner tube 48, which element prevents penetration of the viscous material into the inner tube 48.

In the case of the present exemplary embodiments, the mixing unit 20 is produced using 3D printing, in each instance. In this regard, the mixing tube 22 and the mixing structure 36 are produced in one piece, from the same material, which is a polylactide (PLA) or an acrylonitrile butadiene styrene copolymer (ABS) in the present exemplary embodiment. The valve seat 46 and the sealing element 54 are generally produced from a more wear-resistant material, but are also formed on the mixing tube 22 and/or on the inner tube 48 by means of 3D printing. The valve needle 42 can also be produced, using the 3D printing method, along with the production of the mixing unit 20, wherein metal or hard metal are particularly preferred as materials. In particular when the needle valve 40 is configured as a snuff back valve, production of the valve needle 42 by means of a 3D printing method is advantageous, because the valve needle 42 cannot be introduced into the mixing unit 20 in the longitudinal direction 38. Another possibility, however, is a two-part configuration of the valve needle 42, in which one part is introduced into the mixing unit 20 in the longitudinal direction 38, and one part is introduced by way of the exit opening 34, counter to the longitudinal direction 38, and both parts are then firmly connected to one another. Furthermore, it is apparent that the invention also covers application apparatuses 10 that have a mixing unit having a different mixing structure. Furthermore, the mixing structure 36 can also be able to rotate relative to the mixing tube 22, about its longitudinal center axis.

In summary, the following should be stated:

The invention relates to an apparatus 10 for applying a multi-component viscous material to workpieces, having a metering unit 12 that has a number of feed channels 14 that corresponds to the number of components of the viscous material, for one of the components, in each instance, which channels can be blocked and released by means of metering valves, as well as a coupling device 16, and having a mixing unit 20, which has a material inlet 28, into which the feed channels 14 open, at a first end 24, and a coupling part 26 releasably connected to the coupling device 16, and, at a second end 32, a mixing tube 22 that has an exit opening 34 for the viscous material, as well as a mixing structure 36 arranged in the mixing tube 22, for mixing the components as they are passed through the mixing tube 22 from the material inlet 28 to the exit opening 34. According to the invention, a needle valve 40 is provided for releasing and closing the exit opening 34, which valve has a valve needle 42 that extends in a longitudinal direction 38 that runs from the material inlet 28 to the exit opening 34, which needle releases the exit opening 34 in a release position, and closes it in a closed position, by making contact with a valve seat 46.

Although only a few embodiments of the present invention have been shown and described, it is to be understood that many changes and modifications may be made thereunto without departing from the spirit and scope of the invention.

What is claimed is:

1. An apparatus for applying a multi-component viscous material to workpieces, having a metering unit (12) that has a number of metering valves that corresponds to the number of components of the viscous material, as well as a coupling device (16), and having a mixing unit (20), which has a material inlet (28), and a coupling part (26) releasably connected to the coupling device (16) at a first end (24), and, at a second end (32), a mixing tube (22) that has an exit opening (34) for the viscous material, as well as a mixing structure (36) arranged in the mixing tube (22), for mixing the components as they are passed through the mixing tube (22) from the material inlet (28) to the exit opening (34), the apparatus further comprising a needle valve (40) for releasing and closing the exit opening (34), wherein the needle valve has a valve needle (42) that extends in a longitudinal direction (38) that runs from the material inlet (28) to the exit opening (34), wherein the valve needle releases the exit opening (34) in a release position, and closes the exit opening in a closed position, by making contact with a valve seat (46), wherein the mixing structure (36) has an inner tube (48), which is arranged in the mixing tube (22), and through which tube the valve needle (42) extends, and from which tube a mixing spiral (50) projects away radially, and wherein the valve needle (42) projects out of the inner tube (48) at a front end (52) of the inner tube, wherein the front end faces the valve seat (46), and is conducted to be sealed off at the front end (52), by means of a sealing element (54).

2. The apparatus according to claim 1, wherein the mixing unit (20) is produced in one piece, by means of 3D printing.

3. The apparatus according to claim 1, wherein the mixing unit (20) has different materials.

4. The apparatus according to claim 1, wherein the mixing tube (22) and the mixing structure (36) are produced from a first material, and the valve seat (46) is produced from a second material.

5. The apparatus according to claim 1, wherein the mixing tube (22) and the mixing structure (36) are produced from a first material, and the valve seat (46) and the sealing element (54) are produced from a second material or from different second materials.

6. The apparatus according to claim 1, wherein the needle valve (40) has a drive unit (44) for moving the valve needle (42).

7. The apparatus according to claim 6, wherein the drive unit (44) is a pneumatic drive unit.

8. The apparatus according to claim 6, wherein the drive unit (44) is releasably connected to the metering unit (12).

9. The apparatus according to claim 6, wherein the valve needle (42) can be moved, by means of the drive unit (44), into the closed position in the longitudinal direction (38), and into the release position counter to the longitudinal direction (38).

10. The apparatus according to claim 6, wherein the valve needle (42) can be moved, by means of the drive unit (44), into the release position in the longitudinal direction (38), and into the closed position counter to the longitudinal direction (38).

11. The apparatus according to claim 1, wherein the mixing structure (36) is accommodated so as to rotate in the mixing tube (22), about a rotational axis that runs in the longitudinal direction (38).

12. The apparatus according to claim 1, wherein the mixing tube (22) and the mixing structure (36) are produced from a polylactide (PLA) or an acrylonitrile butadiene styrene copolymer (ABS).

13. The apparatus according to claim 1, wherein the valve needle (42) is produced from a metal.

14. The apparatus according to claim 1, wherein the valve needle (42) is produced together with the mixing unit (20), by means of 3D printing.

15. The apparatus according to claim 11, wherein the mixing structure (36) is motor driven.

* * * * *